(12) United States Patent
Wang et al.

(10) Patent No.: US 10,102,024 B2
(45) Date of Patent: Oct. 16, 2018

(54) SYSTEM AND METHODS TO CREATE VIRTUAL MACHINES WITH AFFINITY RULES AND SERVICES ASYMMETRY

(71) Applicant: VMware, Inc., Palo Alto, CA (US)

(72) Inventors: Jun Wang, Beijing (CN); Jian Zhang, Beijing (CN); Yixing Jia, Beijing (CN); Maosheng Ren, Beijing (CN); Wenwu Peng, Beijing (CN)

(73) Assignee: VMware, Inc., Palo Alto, CA (US)

( * ) Notice: Subject to any disclaimer, the term of this patent is extended or adjusted under 35 U.S.C. 154(b) by 126 days.

(21) Appl. No.: 15/231,799

(22) Filed: Aug. 9, 2016

(65) Prior Publication Data

US 2018/0046481 A1 Feb. 15, 2018

(51) Int. Cl.
*G06F 9/455* (2018.01)

(52) U.S. Cl.
CPC ............ *G06F 9/45558* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| 2010/0017804 | A1* | 1/2010 | Gupta | G06F 9/5033 718/102 |
| 2013/0086235 | A1* | 4/2013 | Ferris | G06F 9/505 709/223 |
| 2015/0234674 | A1* | 8/2015 | Zhong | G06F 9/45558 718/1 |
| 2016/0342438 | A1* | 11/2016 | Cropper | G06F 9/5077 |

* cited by examiner

*Primary Examiner* — Gregory A Kessler
(74) *Attorney, Agent, or Firm* — Clayton, McKay & Bailey, PC

(57) ABSTRACT

System and methods for creating and configuring virtual machines (VMs) are provided. The method may include receiving, a first VM configuration and a second VM configuration. The second VM configuration is related to the first VM configuration. The method may include creating a first plurality of VMs in a first VM group based on the first VM configuration and creating a second plurality of VMs in the first VM group based on the second VM configuration. The method may further include applying the affinity rule in the first VM configuration to the first plurality of VMs and the second plurality of VMs. The method may further include configuring the first plurality of VMs based on the set of VM services in the first VM configuration and the second plurality of VMs based on the set of VM services in the second VM configuration.

20 Claims, 3 Drawing Sheets

SYSTEM AND METHODS TO CREATE VIRTUAL MACHINES WITH AFFINITY RULES AND SERVICES ASYMMETRY

BACKGROUND

When creating a group of virtual machines with affinity or anti-affinity rules, a common set of virtual machine services may be deployed to each of the virtual machines in a virtual machine group. However, in some special cases, having the same set of virtual machine services for all the virtual machines in the virtual machine group may not be sufficient, as some of the virtual machines may need to have specific services deployed (e.g., services to reduce the workload of the virtual machine group), without needing the other virtual machine services that are common to the other virtual machines.

SUMMARY

Systems and methods for creating and configuring virtual machines (VMs) are provided. The method may include receiving, a first VM configuration and a second VM configuration. The second VM configuration is related to the first VM configuration. The method may create a first plurality of VMs in a first VM group based on the first VM configuration, and create a second plurality of VMs in the first VM group based on the second VM configuration. The method may further apply the affinity rule in the first VM configuration to the first plurality of VMs and the second plurality of VMs. The method may further configure the first plurality of VMs based on the set of VM services in the first VM configuration and the second plurality of VMs based on the set of VM services in the second VM configuration.

DETAILED DESCRIPTION

Figure 1:
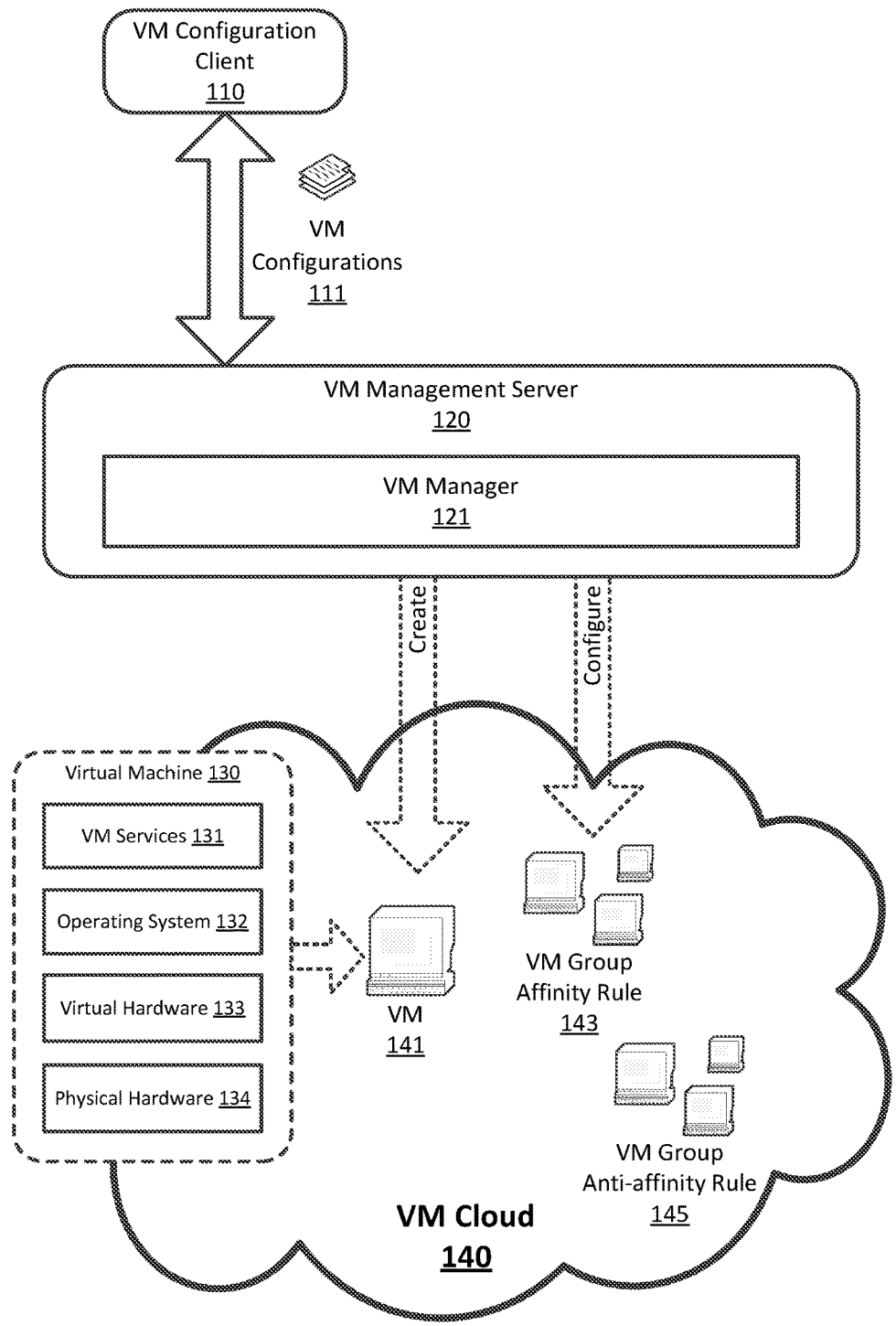
FIG. 1 illustrates a block diagram of a virtualized computer environment that can be utilized to create virtual machines with affinity rules and services asymmetry, according to one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 illustrates a block diagram of a virtualized computer environment that can be utilized to create virtual machines with affinity rules and services asymmetry, according to one or more embodiments of the present disclosure. In FIG. 1, a VM configuration client 110 may interact with a VM management server 120 to create and configure one or more VMs (e.g., VM 141) in a VM cloud 140. The VM configuration client 100 may initiate the creating and configuring of the VMs by transmitting one or more VM configurations 111 to the VM management server 120. Specifically, the VM configuration client 110 may be installed on a client computer (e.g., a personal computer or workstation) to connect to the VM management server 120 for accessing and managing the VMs, as well as performing any virtualized management tasks. The VM configuration client 110 may interact with the VM management server 120 via Transmission Control Protocol/Internet Protocol (TCP/IP), Hypertext Transfer Protocol (HTTP), or any other network communication means. Alternatively, the VM configuration client 110 may be implemented as a software/hardware module executing directly on the VM management server 120. In some embodiments, the VM management server 120 may be implemented using a VMWARE® vSphere ESXi server, and the VM configuration client 110 may be implemented using a VMWARE® vSphere client.

In some embodiments, the VM management server 120 may be configured to manage a VM cloud 140, which contains, among other components, one or more VMs (e.g, VM 140), one or more VM groups (e.g., VM group 143), and/or one or more data centers (not shown in FIG. 1). The VM cloud 140 may be a network-based computing architecture that provides a shared pool of computing resources (e.g., networks, data storages, applications, and services) on demand. The VM management server 120 may implement the VM cloud 140 based on a virtualized infrastructure, in order to provide provisioning, pooling, high-availability, and automation to these computing resources. Specifically, the VM management server 120 may configure these computing resources using one or more VMs 130.

In some embodiments, a "virtual machine" (VM) 130 may be an abstraction of an actual physical computer system. The physical computer system may be based on (e.g., installed on) a physical hardware platform 134, which may be referred to as a "host", a "physical host", or a "host component" of the VM 130. The VM management server 120 may include a "hypervisor" to construct the virtual hardware platform 133 based on the physical hardware platform 134. The virtual hardware platform 133 may be referred to as a "guest component" of the VM 130. Thus, the physical hardware platform 134 may include the underlying hardware that provides computing resources (e.g., processing power, memory, disk and network I/O (input/output)) to the virtual hardware platform 133, thereby allowing the VM 130 to function as if it were a physical machine.

In some embodiments, the physical hardware platform 134 (e.g., an x86 architecture platform) may be configured with, without limitation, one or more physical Central Processing Unit (CPU), physical memory, physical storage (e.g., hard drive), physical Network Interface Card (NIC), and/or additional electronic circuit components (all of which are not shown in FIG. 1). The physical CPU may be a general-purpose or specialized computing processor having electronic circuitry to perform arithmetical, logical, and input/output operations for the physical hardware platform 134. The physical CPU may be configured to support functions of the VM 130 and/or the VM management server 120. The physical memory may be hardware storage devices having integrated circuits for storing information used in the VM management server 120 and VMs 130. The physical memory may be volatile memory (e.g., dynamic random-access memory (DRAM) or CPU cache memory) or non-volatile memory (e.g., hard drive or flash memory). In some embodiments, the physical memory may be non-transitory computer-readable storage medium, containing a set of instructions which, when executed by the physical CPU, cause the physical CPU to perform methods of creating and configuring VMs 130. The NIC may be network communication hardware for transmitting messages in the VM cloud 140.

In some embodiments, the virtual hardware platform 133 may be configured with one or more "virtual hardware components", which are supported by the physical hardware components in the physical hardware platform 134. In other words, the virtual hardware components, which may include, without limitation, one or more virtual CPUs, virtual memory, virtual storage, virtual NIC, may be configured to emulate the physical hardware components in the physical hardware platform 134. After a VM 130 is created, a guest operating system (OS) 132 may be installed in the VM 130 to execute and support applications and services such as VM services 131. The OS 132 may be a WINDOWS®, UNIX®, LINUX®, or iOS® operating system. And the VM services 131 may include any network, storage, image, or application services that can be executed on the VM 130 based on the OS 132. After the VM 130 is created, it may be used to provide various cloud services in the VM cloud 130.

In some embodiments, the VM management server 120 may include a VM manager 121 to manage the creating and configuring of the VM cloud 140 and the VMs 130. The VM manager 121 may provide centralized management capabilities, such as VM creation, VM configuration, VM updates, VM cloning, VM high-availability, VM resource distributions, etc. In some embodiments, the VM manager 121 may be a VMWARE® vCenter server installed on MICROSOFT WINDOWS® server or a LINUX® server.

In some embodiments, the VM manager 121 may create and configure one or more VM groups in the VM cloud 140. A "VM group" may include multiple hosts and the associated VMs 130 with shared resources and shared management interfaces. For example, a VM group may be a VMWARE® Distributed Resource Scheduler (DRS) cluster. Further, the hosts and the VMs in a VM group may be configured with an affinity rule. An "affinity rule" may be a restriction that is applied to the VMs 130 and hosts during installation and configuration. Specifically, an affinity rule may be a "positive-affinity" or an "anti-affinity" rule. A positive-affinity rule may dictate that a certain VM 130 should be installed on a particular host, or multiple VMs 130 should be installed on a common host. An anti-affinity rule may indicate that multiple VMs 130 should NOT share a common host, and should always be installed onto different hosts respectively.

For example, the VM group 143 may be configured with positive-affinity rules. In this case, the VM manager may create and configure the VMs in the VM group 143 together on a common or dedicated host. The VM group 145 may be configured with anti-affinity rules. In this case, the VM manager may create and configure each of the VMs in the VM group 145 onto a corresponding host that is not shared by any other VMs in the VM group 145. Thus, the positive-affinity rules and anti-affinity rules may instruct the VM manager 121 to keep the VMs 130 either together or separated, in order to reduce traffic across the networks or keep the virtual workload balanced in the VM cloud 140.

In some embodiments, the VM manager 121 may create and configure the VMs 130 in the VM cloud 140 based on one or more VM configurations 111 received from the VM configuration client 110. Specifically, a "VM configuration" may be a data container including a set of parameters and/or flags for the creating and configuring of a VM group having one or more VMs 130. Based on the VM configurations 111, the VM manager 121 may create a VM group 143, create the VMs 130 in the VM group 143, and configure the VMs 130 as well as VM group 143. Examples of VM configuration parameters may include: VM group information, number of VMs to be created in the VM group, the affinity rule associated with the VMs created in the VM group, and the VM services to be installed onto the VMs. Additional parameters, such as virtual hardware configurations, physical hardware configurations, data storage configurations, as well as all any software and applications to be installed on the VMs, may also be defined in the VM configuration 111.

In some embodiments, the VM manager 121 may receive a VM configuration 111 for the creating of a VM group with positive-affinity rules (e.g., VP group 143). For example, certain applications may have host-based licensing policies. In this case, these applications need to be installed and executed in certain specific hosts, and the VMs for executing these applications may also need to be tied to these specific hosts. Thus, the VM configuration 111 may include "VM-Host positive-affinity rules" to define the relations among the VMs and the hosts, so that the VMs 130 that are executing the applications may never be migrated to other hosts. In another example, a multi-tier application may include a client component, a server component, and a database component, each of these components being deployed to a dedicated VM. These dedicated VMs may require a high amount of network communication if they reside on different hosts. In this case, the VM configuration 111 may include "VM-VM positive-affinity rules" to group these VMs together in a common host, thereby reducing the network communications among these application components. Thus, based on these VM configurations 111, the VM manager 121 may create and configure the VM group 143 with specific affinity rules.

In some embodiments, the VM manager 121 may receive a VM configuration 111 for the configuration of a VM group with anti-affinity rules (e.g., VM group 145). As described above, an anti-affinity rule may prevent VMs from sharing a common host. For example, certain enterprise servers (e.g., network domain controllers or database servers) may require fail-safe configurations such as load-balancing or redundancy. If the VMs for these enterprise servers are hosted on a single physical host, then any failure or restart of the physical host may lead to the interruption of these enterprise servers. In this case, the VM configuration 111 may define "VM-VM anti-affinity rules" to ensure that the VMs for these enterprise servers will run on different physical hosts.

In some embodiments, the VM manager 121 may create and configure the VMs 130 in a VM group with identical VM services. Alternatively, the VM configurations 111 may define a VM group having service asymmetry among the VMs contained therein. "Service asymmetry" may refer to the VMs in a VM group having asymmetrical (different) VM services. For example, a first VM 130 in the VM group 143 may be dedicated to provide network services, while a second VM 130 in the same VM group 143 may be configured to support data storage services. In this case, the VM manager 121 may automatically create the first VM and the second VM, configure these VMs in a VM group with affinity or anti-affinity rules, and configure different VM services on these VMs respectfully. The details of the creating and configuring VMs with affinity rules and services asymmetry are further described below.

Figure 2:
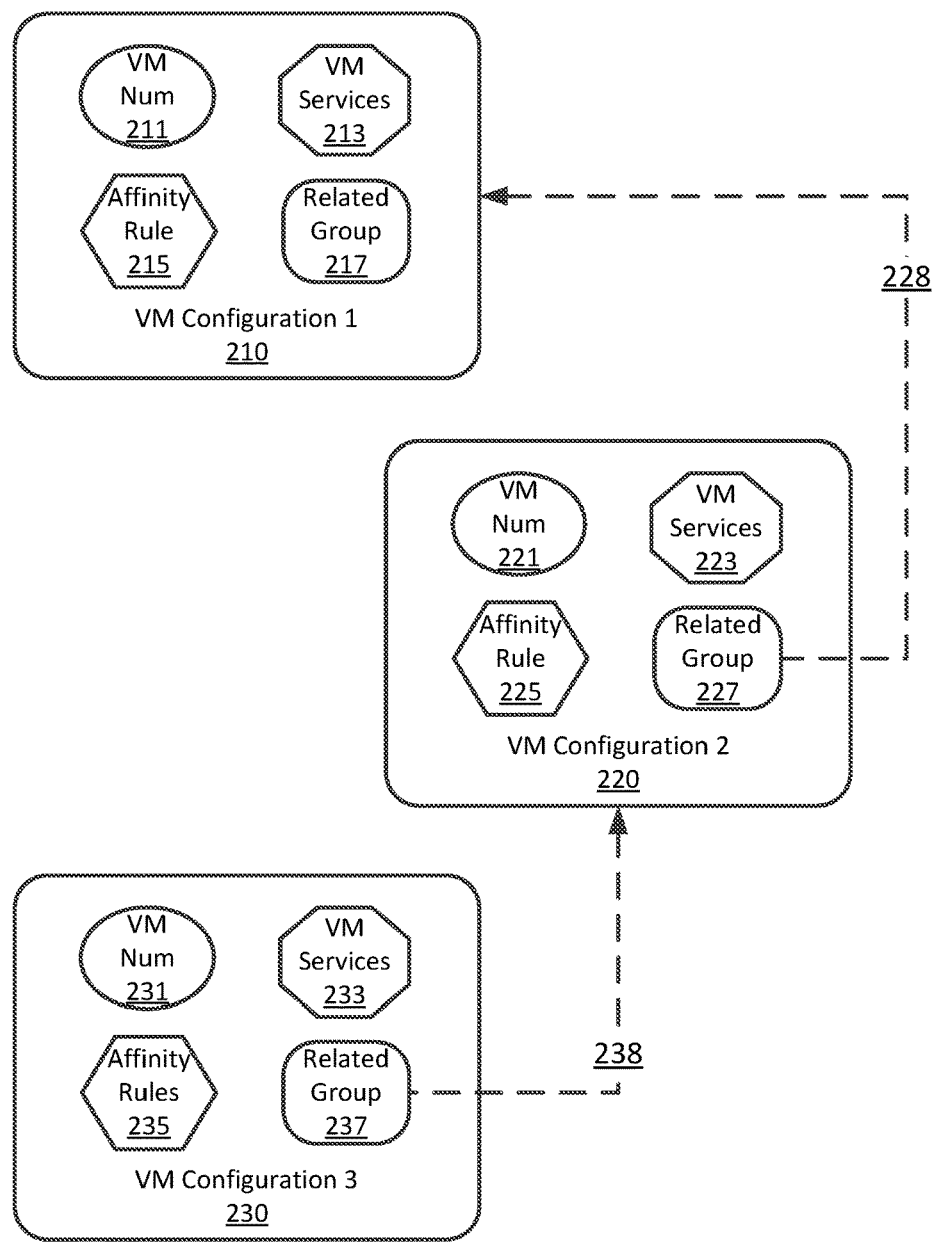
FIG. 2 illustrates multiple virtual machine configurations for creating and configuring virtual machines with affinity rules and services asymmetry, according to one or more embodiments of the present disclosure.

FIG. 2 illustrates multiple virtual machine configurations for creating and configuring virtual machines with affinity rules and services asymmetry, according to one or more embodiments of the present disclosure. Specifically, a VM manager (similar to the VM manager 121 of FIG. 1) of a VM management server (similar to the VM management server 120 of FIG. 1) may receive from a VM configuration client (similar to the VM configuration client 110 of FIG. 1) a set of VM configurations 210, 220, or 230. The VM configuration 210 may include configuration parameters such as VM number 211, VM services 213, affinity rule 215, and related group 217. The VM number 211 may show the number of VMs to be created in the VM group. The VM services 223 may contain a set of values describing the various VM services (e.g., VM services 131 of FIG. 1) to be installed onto the VMs in the VM group. The affinity rule 215 may have a value indicating whether to configure the VMs in the VM group using a VM-Host positive-affinity rule, a VM-VM positive-affinity rule, or a VM-VM anti-affinity rule. And the related group 217 may be used to configure service asymmetry as described below.

In some embodiments, the VM manager may process the configuration parameters of the VM configuration 210, and create a first VM group in a VM cloud (similar to the VM cloud 140 of FIG. 1). Afterward, the VM manager may create a number of VMs in the first VM group based on the VM configuration 210's VM number 211. Specifically, for each VM to be created, the VM manager may automatically create a virtual hardware platform based on the physical hardware platform supported by the VM management server. Afterward, the VM manager may install the necessary operating system to the newly created VM. The VM manager may further install and configure the VM services on the newly created VM based on the VM configuration 210's VM services 213. After all the VMs are created, the VM manager may apply a VM-Host positive-affinity rule, a VM-VM positive-affinity rule, or a VM-VM anti-affinity rule to these newly created VMs, as instructed by the affinity rule 215 in the VM configuration 210.

In some embodiments, after finished creating or configuring a first VM group with multiple VMs based on the VM configuration 210, the VM manager may process the configuration parameters of the VM configuration 220. The VM configuration 220 may include configuration parameters such as VM number 221, VM services 223, and affinity rule 225, all of which are similar to their respective counterparts in the VM configuration 210. In some embodiments, the VM configuration 220 may contain a related group 227 having a value indicating an association with the VM configuration 210. In this case, rather than creating a new and distinctive VM group based on the VM configuration 220, the VM manager may create the VMs listed in the VM number 221 in the same first VM group that was created based on the VM configuration 210. Thus, after all the VMs in the VM configuration 220 are created, the first VM group may contain all the VMs that are defined in both the VM number 211 and VM number 221. Alternatively, if the related group 227 in the VM configuration 220 is not associated with any other VM configurations (e.g., being NULL), then the VM manager may create a new and distinct second VM group for the VMs of the VM configuration 220.

In some embodiments, if the related group 227 in the VM configuration 220 is not associated with any other VM configurations, the VM manager may apply the affinity rule 225 to the VMs created based on the VM configuration 220. Alternatively, when the related group 227 in the VM configuration 220 is associated with the VM configuration 210, then the VM manager may disregard the affinity rule 225, and configure the VMs based on the affinity rule 215 of the VM configuration 210. Based on the contents in the related group 227, the VMs created based on the VM configuration 220 may share the same affinity rule as the VMs created based on the VM configuration 210.

In some embodiments, after the creating of the VMs of the VM configuration 220 in the first VM group created based on the VM configuration 210, the VM manager may configure the services for the VMs of the VM configuration 220 based on the VM services 223. Thus, the VMs that are configured based on the VM services 213 of the VM configuration 210 may have different services installed comparing to the VMs that are configured based on the VM services 223 of the VM configuration 220. As a result, the VMs that belong to the same first VM group may share the same affinity rule, while being configured with different services. By using the VM configurations 210 and 220, the VM manager may create and configure VMs with common affinity rules and service asymmetry.

In some embodiments, the VM manager may further process the configuration parameters in the VM configuration 230. The VM configuration 230 may include configuration parameters such as VM number 231, VM services 233, and affinity rule 235 that are similar to their respective counterparts in the VM configuration 210 or VM configuration 220. Further, the VM configuration 230 may contain a related group 237 which is associated with the VM configuration 220. In this case, rather than creating a distinctive third VM group based on the VM configuration 230, the VM manager may create the VMs for the VM configuration 230 in the same VM group that was created or used based on the VM configuration 220. Since the VMs for the VM configuration 220 are created in the first VM group as the VMs for the VM configuration 210, the VM manager may create the VMs for the VM configuration 230 in the same first VM group, and subject these VMs to the same affinity rule 215. Afterward, the VM manager may install and configure the VMs for the VM configuration 230 VM services defined based on the VM services 233. Once all configurations are completed, the first VM group may contain all the VMs that are defined by the VM numbers 211, 221 and 231. Even though these VMs may share the same affinity rule as defined in the affinity rule 215 of the VM configuration 210, the services that are installed and configured in these VMs may be asymmetrical.

In some embodiments, the VM configuration 230 may contain a related group 237 which is not associated with any VM configuration. In this case, the VM manager may create a distinctive third VM group based on the VM configuration 230, and create the VMs for the VM configuration 230 in the third VM group. Further, the VM manager may subject these VMs to the affinity rule 235, and configure the VM services for these VMs based on the VM services 233. After configuration, the third VM group may only contain the VMs that are defined by the VM 231, and does not share the affinity rule with first VM group as defined by the VM configuration 210.

For example, the VM manager may receive from the VM configuration client two VM configurations as shown below:
1. VM Configuration for "controller":
   {VM services: ["network", "storage", "image"]; VM number: 2; affinity_rule: "anti_affinity"; related_group: null}
2. VM Configuration for "network":
   {VM services: ["network"]; VM number: 1; affinity_rule: null; related_group: "controller"}

Based on the above two VM configurations, the VM manager may create a single VM group, and create 3 VMs in this VM group with a common "anti-affinity rule" as defined in the VM Configuration for "controller." Afterward, the VM manager may deploy network, storage, and image VM services on 2 of the 3 VMs defined in the VM Configuration for "controller", and deploy a network VM service on 1 of the 3 VMs defined in the VM Configuration for "network." Further, the VM manager may generate a VM name for each of the VMs by associating the VM configuration name with a distinctive VM number: e.g., <controller, vm1>, <controller, vm2>, or <network, vm3>. Afterward, the VM manager may deploy the network, storage, and image VM services to the VMs: <controller, vm1>, <controller, vm2>, and deploy the network VM service to the VM: <network, vm3>.

Figure 3:
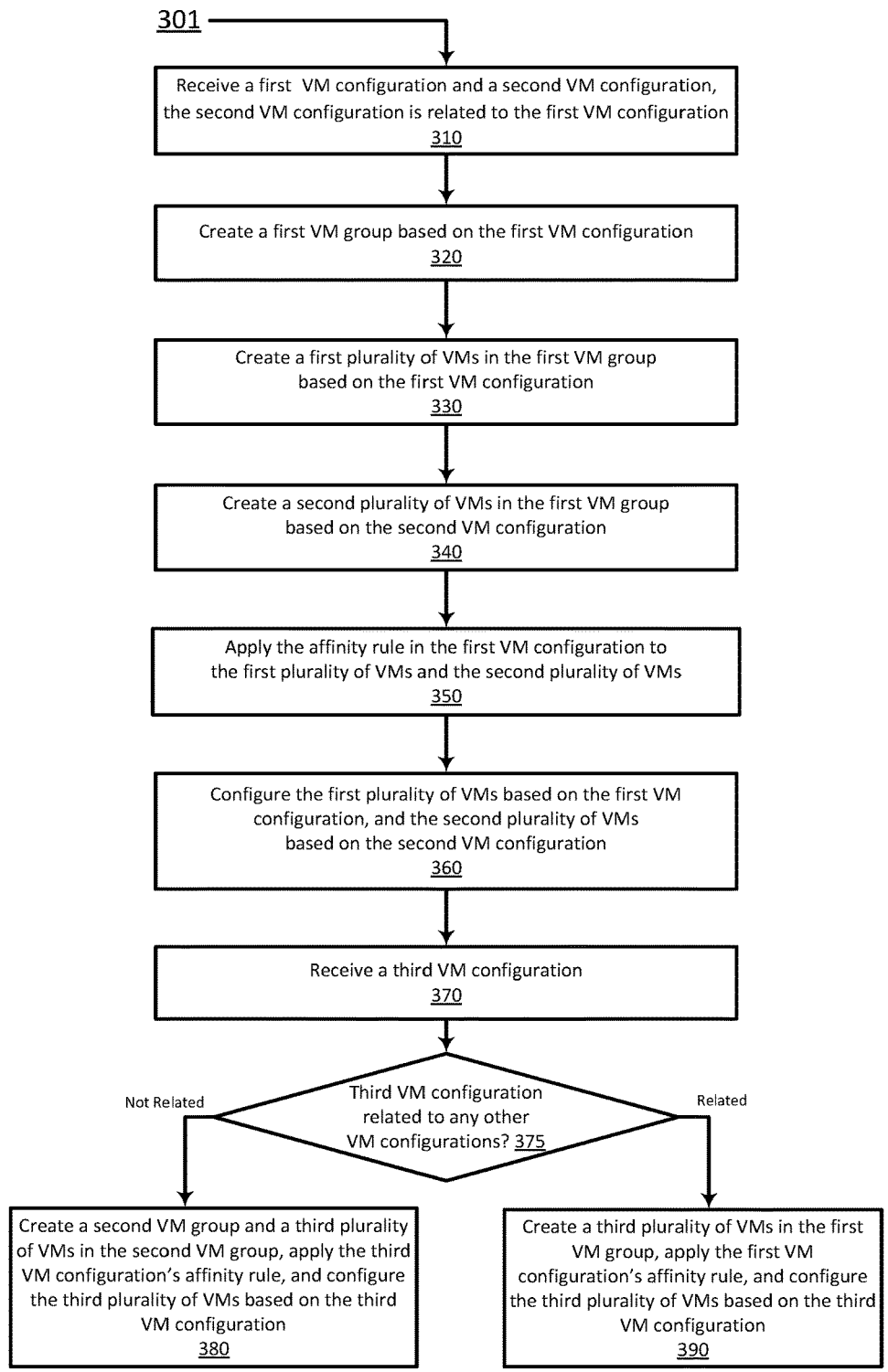
FIG. 3 shows a flow diagram illustrating a process to create and configure virtual machines with affinity rules and services asymmetry, according to one or more embodiments of the present disclosure.

FIG. 3 shows a flow diagram illustrating a process to create and configure virtual machines with affinity rules and services asymmetry, according to one or more embodiments of the present disclosure. The processes 301 may set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 3 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 310, a VM manager in a VM management server may receive from a VM configuration client a plurality of VM configurations, including a first VM configuration and a second VM configuration. Each of the plurality of VM configurations may contain a corresponding VM number, a corresponding affinity rule, and a corresponding set of VM services. In some embodiments, the second VM configuration is related to the first VM configuration.

At block 320, upon determining that the first VM configuration is not related to any other VM configurations, the VM manager may create a first VM group based on the first VM configuration. Specifically, the VM manager may create the first VM group in a VM cloud managed by the VM management server.

At block 330, the VM manager may create a first plurality of VMs in the first VM group based on the VM number in the first VM configuration. Specifically, the VM manager may utilize the hypervisor in the VM management server to create a virtual hardware platform for each of the plurality of VMs based on a physical hardware platform supported by the VM management server. Afterward, the VM manager may install corresponding operating systems in the first plurality of VMs.

At block 340, the VM manager may create a second plurality of VMs in the first VM group based on the VM number in the second VM configuration, similarly to the operations performed at block 330. Afterward, the first plurality of VMs and the second plurality of VMs are located in the same first VM group.

At block 350, the VM manager may apply the affinity rule in the first VM configuration to the first plurality of VMs and the second plurality of VMs. In some embodiments, the affinity rule in the first VM configuration may be a VM-VM affinity rule, a VM-host affinity rule, or a VM-VM anti-affinity rule. Further, the VM manager may ignore the affinity rule in the second VM configuration.

At block 360, the VM manager may configure the first plurality of VMs based on the set of VM services in the first VM configuration and the second plurality of VMs based on the set of VM services in the second VM configuration. When the set of VM services in the first VM configuration are different from the set of VM services in the second VM configuration, the VM manager may achieve the configuring of the VMs with a common affinity rule but asymmetrical services.

At block 370, the VM manager may receive a third VM configuration containing a corresponding VM number, a corresponding affinity rule, and a corresponding set of VM services. At block 375, the VM manager may determine whether the third VM configuration is related to any other VM configurations. If the VM manager determines that the third VM configuration is not related to any other VM configurations, process 301 may proceed to block 380.

At block 380, in response to a determination at block 375, the VM manager may create a second VM group for the third VM configuration, and create a third plurality of VMs in the second VM group based on the VM number in the third VM configuration. Further, the VM manager may apply the affinity rule in the third VM configuration to the third plurality of VMs, and configure the third plurality of VMs based on the set of VM services in the third VM configuration.

If the VM manager determines at block 375 that the third VM configuration is related to the second VM configuration. Process 301 may proceed to block 390. At block 390, in response to a determination at block 375, the VM manager may create a third plurality of VMs in the first VM group based on the VM number in the third VM configuration. Afterward, the VM manager may apply the affinity rule in the first VM configuration to the third plurality of VMs, and configure the third plurality of VMs based on the set of VM services in the third VM configuration.

Thus, systems and methods for creating and configuring virtual machines with affinity rules and services asymmetry have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations.

In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term non-transitory computer readable storage medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-ft or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for creating and configuring virtual machines (VMs), the method comprising
    receiving, by a VM manager, a first VM configuration and a second VM configuration, wherein each of the first VM configuration and the second VM configuration contains a corresponding VM number, a corresponding affinity rule, and a corresponding set of VM services, and the second VM configuration is related to the first VM configuration;
    creating, by the VM manager, a first plurality of VMs in a first VM group, the first plurality of VMs having a number of VMs equal to the VM number in the first VM configuration;
    creating, by the VM manager, a second plurality of VMs in the first VM group, the second plurality of VMs having a number of VMs equal to the VM number in the second VM configuration;
    applying, by the VM manager, the affinity rule in the first VM configuration to the first plurality of VMs and the second plurality of VMs; and
    configuring, by the VM manager, the first plurality of VMs based on the set of VM services in the first VM configuration and the second plurality of VMs based on the set of VM services in the second VM configuration.

2. The method as recited in the claim 1, further comprising:
    in response to a determination that the first VM configuration is not related to any other VM configurations, creating, by the VM manager, the first VM group prior to the creating of the first plurality of VMs.

3. The method as recited in the claim 1, further comprising:
    receiving, by the VM manager, a third VM configuration containing a corresponding VM number, a corresponding affinity rule, and a corresponding set of VM services, wherein the third VM configuration is not related to any other VM configurations;
    creating, by the VM manager, a second VM group; and
    creating, by the VM manager, a third plurality of VMs in the second VM group based on the VM number in the third VM configuration.

4. The method as recited in the claim 3, further comprising:
applying, by the VM manager, the affinity rule in the third VM configuration to the third plurality of VMs; and
configuring, by the VM manager, the third plurality of VMs based on the set of VM services in the third VM configuration.

5. The method as recited in the claim 1, further comprising:
receiving, by the VM manager, a third VM configuration containing a corresponding VM number, a corresponding affinity rule, and a corresponding set of VM services, wherein the third VM configuration is related to the second VM configuration; and
creating, by the VM manager, a third plurality of VMs in the first VM group based on the VM number in the third VM configuration.

6. The method as recited in the claim 5, further comprising:
applying, by the VM manager, the affinity rule in the first VM configuration to the third plurality of VMs; and
configuring, by the VM manager, the third plurality of VMs based on the set of VM services in the third VM configuration.

7. The method as recited in the claim 1, wherein the corresponding affinity rule is a VM-VM affinity rule, a VM-host affinity rule, or a VM-VM anti-affinity rule.

8. The method as recited in the claim 1, wherein the set of VM services in the first VM configuration are different from the set of VM services in the second VM configuration.

9. A non-transitory computer-readable storage medium, containing a set of instructions which, when executed by a processor, cause the processor to perform a method for creating and configuring virtual machines (VMs), the method comprising:
receiving, by a VM manager, a first VM configuration and a second VM configuration, wherein each of the first VM configuration and the second VM configuration contains a corresponding VM number, a corresponding affinity rule, and a corresponding set of VM services, and the second VM configuration is related to the first VM configuration;
creating, by the VM manager, a first plurality of VMs in a first VM group, the first plurality of VMs having a number of VMs equal to the VM number in the first VM configuration;
creating, by the VM manager, a second plurality of VMs in the first VM group, the second plurality of VMs having a number of VMs equal to the VM number in the second VM configuration;
applying, by the VM manager, the affinity rule in the first VM configuration to the first plurality of VMs and the second plurality of VMs; and
configuring, by the VM manager, the first plurality of VMs based on the set of VM services in the first VM configuration and the second plurality of VMs based on the set of VM services in the second VM configuration.

10. The non-transitory computer-readable storage medium of the claim 9, wherein the method further comprising:
in response to a determination that the first VM configuration is not related to any other VM configurations, creating, by the VM manager, the first VM group prior to the creating of the first plurality of VMs.

11. The non-transitory computer-readable storage medium of the claim 9, wherein the method further comprising:
receiving, by the VM manager, a third VM configuration containing a corresponding VM number, a corresponding affinity rule, and a corresponding set of VM services, wherein the third VM configuration is not related to any other VM configurations;
creating, by the VM manager, a second VM group; and
creating, by the VM manager, a third plurality of VMs in the second VM group based on the VM number in the third VM configuration.

12. The non-transitory computer-readable storage medium of the claim 11, wherein the method further comprising:
applying, by the VM manager, the affinity rule in the third VM configuration to the third plurality of VMs; and
configuring, by the VM manager, the third plurality of VMs based on the set of VM services in the third VM configuration.

13. The non-transitory computer-readable storage medium of the claim 9, wherein the method further comprising:
receiving, by the VM manager, a third VM configuration containing a corresponding VM number, a corresponding affinity rule, and a corresponding set of VM services, wherein the third VM configuration is related to the second VM configuration; and
creating, by the VM manager, a third plurality of VMs in the first VM group based on the VM number in the third VM configuration.

14. The non-transitory computer-readable storage medium of the claim 13, wherein the method further comprising:
applying, by the VM manager, the affinity rule in the first VM configuration to the third plurality of VMs; and
configuring, by the VM manager, the third plurality of VMs based on the set of VM services in the third VM configuration.

15. The non-transitory computer-readable storage medium of the claim 9, wherein the corresponding affinity rule is a VM-VM affinity rule, a VM-host affinity rule, or a VM-VM anti-affinity rule.

16. The non-transitory computer-readable storage medium of the claim 9, wherein the set of VM services in the first VM configuration are different from the set of VM services in the second VM configuration.

17. A system for creating and configuring virtual machines (VMs), the system comprising a processor and memory coupled with the processor, wherein the memory is configured to provide the processor with instructions for
receiving, by a VM manager executing in the system, a plurality of VM configurations, wherein each of the VM configurations contains a corresponding VM number, a corresponding affinity rule, and a corresponding set of VM services;
for a first VM configuration selected from the plurality of VM configurations and not related to any other VM configurations, creating, by the VM manager, a first VM group and a first plurality of VMs in the first VM group, the first plurality of VMs having a number of VMs equal to the VM number in the first VM configuration;
for a second VM configuration selected from the plurality of VM configurations and related to the first VM configuration, creating, by the VM manager, a second plurality of VMs in the first VM group, the second plurality of VMs having a number of VMs equal to the VM number in the second VM configuration;

applying, by the VM manager, the affinity rule in the first VM configuration to the first plurality of VMs and the second plurality of VMs in the first VM group; and configuring, by the VM manager, asymmetrical services for the first plurality of VMs based on the set of VM services in the first VM configuration, and for the second plurality of VMs based on the set of VM services in the second VM configuration.

18. The system of claim 17, wherein the memory is further configured to provide the processor with instructions for:

ignoring, by the VM manager, the affinity rule in the second VM configuration.

19. The system of claim 17, wherein the corresponding affinity rule is a VM-VM affinity rule, a VM-host affinity rule, or a VM-VM anti-affinity rule.

20. The system of claim 17, wherein the asymmetrical services indicate that the set of VM services in the first VM configuration are different from the set of VM services in the second VM configuration.

* * * * *